United States Patent [19]

Alais et al.

[11] 3,851,381

[45] Dec. 3, 1974

[54] METHOD FOR MANUFACTURING THERMOELECTRIC MODULES

[75] Inventors: Michel Alais; André Stahl, both of Orsay, France

[73] Assignee: Compagnie Industrielle des Telecommunications CIT-ALCATEL, Paris, France

[22] Filed: Nov. 9, 1973

[21] Appl. No.: 414,304

[30] Foreign Application Priority Data

Nov. 9, 1972 France .............................. 72.39753

[52] U.S. Cl. ..................................... 29/573, 29/583
[51] Int. Cl. ............................................. B01j 17/00
[58] Field of Search ........... 29/573, 583, 580, 576 S

[56] References Cited

UNITED STATES PATENTS

| | | | |
|---|---|---|---|
| 2,980,746 | 4/1961 | Claydon | 29/573 |
| 3,276,105 | 10/1966 | Alais | 29/573 |
| 3,279,036 | 10/1966 | Fuller | 29/573 |
| 3,626,583 | 12/1971 | Abbott | 29/573 |

*Primary Examiner*—Roy Lake
*Assistant Examiner*—W. C. Tupman
*Attorney, Agent, or Firm*—Craig & Antonelli

[57] ABSTRACT

Method consisting in cutting out P and N semiconductor rods from P blocks and N blocks and in assembling them in series to form a thermoelectric module. Industrial manufacturing consists in welding by collectively dipping the assembly of rods after having inserted insulating sheets extending beyond the level of the rods at the places where it is not necessary to set up a connection bridge.

6 Claims, 8 Drawing Figures

METHOD FOR MANUFACTURING THERMOELECTRIC MODULES

The present invention concerns a method for the industrial manufacturing of thermoelectric modules, by collective welding of thermocouples.

It is known that the industrial manufacturing of thermoelectric devices using the Seeback effect for the converting of heat into electricity or the Peltier effect for refrigeration, involves, at the present time, problems concerning the connecting of elements of P type and of N type. The thermoelectric devices effectively produced on an industrial or semi-industrial scale comprise a fairly great number of thermoelectric couples, and electrical connection problems arise from the difficulty and price point of view.

It is known that a certain number of solutions have been proposed for these problems. According to certain of these solutions, all the welds are made individually, generally by hand. These solutions are an advantage when the production concerns only a limited number of elements intended for prototypes.

According to other solutions, all the welds are effected collectively, this generally requiring long adjusting operations and relatively expensive equipment, so that the costs are difficult to redeem. The latter solution therefore generally does not become an economical method until the manufacturer is certain to be required to manufacture a very great number of thermoelectric devices.

Nevertheless, the development of the applications of thermoelectric devices, which are unceasingly renewed, has led the inventor to contrive a simpler technology enabling the welds to be effected collectively by dipping.

The method according to the invention is a method for the industrial manufacturing of thermoelectric modules by collective welding of the thermocouples from blocks of P type and of N type material having a parallelepipedical shape and having the same dimensions and a predetermined granulometry comprising:

A first phase consisting in cutting out these parallelepipedical blocks parallel to one of their faces in strips of P type and strips of N type;

A second phase consisting in assembling alternately the same number of strips of P type and of N type after having inserted, between the adjacent faces, insulating sheets which are very thin and have the same width as the strips, to form a parallelepipedical P and N stack;

A third phase consisting in cutting out that P and N stack into thin slices formed by rods in a direction perpendicular to the faces of the P and N strips;

A fourth phase consisting in forming a parallelepipedical stack by assembling in parallel a certain number of these slices after having inserted, between the adjacent faces, very thin insulating sheets so as to place successively a slice beginning with a P rod and a slice beginning by an N rod;

A fifth phase consisting in establishing conductive connections between the P and N rods;

Characterized in that the insulating sheets inserted between the P strips and N strips during the second phase have a height slightly greater than that of the strips and are arranged alternately so as to be substantially flush with the strips on one face of the P stack and N stack and overlapping slightly on the other face and in that the insulating sheets inserted between each slice during the fourth phase overlap slightly on the two opposite faces of the stack and have, at their lower corner, a rectangular cutaway part arranged alternately on the right and on the left of the stack E, the establishing of junctions during the fifth phase being effected by dipping of the said two opposite faces in brazing material.

The method implemented, the considerations which led the inventor to adapt that method and the examples of an exemplary embodiment will be more easily understood on referring to the following description relating to the accompanying drawings.

FIGS. 1*a* through 1*c* show diagrammatically a set of thermoelectric couples;

FIGS. 2*a* and 2*b* show the first cutting out operation on a block of material of P type, for example;

The inventor aims at producing standard "modules" of thermoelectric elements capable of being used directly such as they stand in an equipment or intended to be assembled to form greater groups of thermoelectric elements, each module being capable of grouping a few tens to a few hundreds of elements without their number being critical.

Figure 1A:
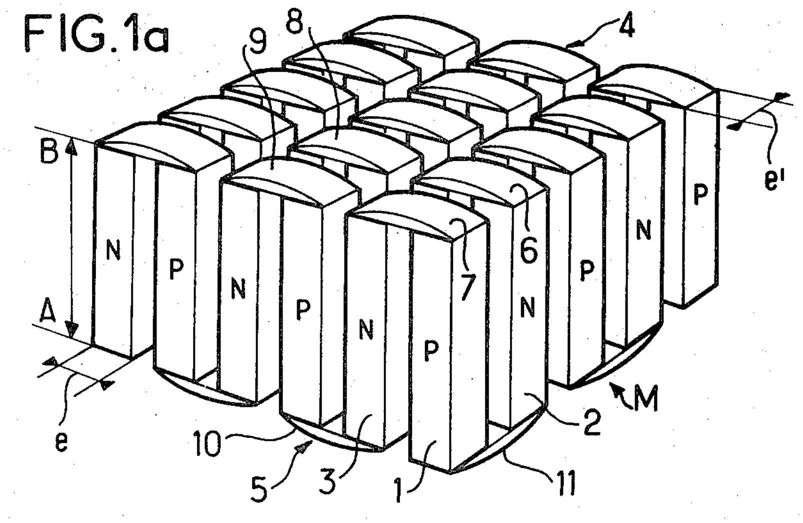

The figure shows such a module M. A perspective of such a module may be seen in FIG. 1*a*. It is constituted by P and N rods such as 1, 2, and 3 linked on the upper face 4 by connections such as 6, 7, 8 and 9 parallel to one another and on the lower face 5 by parallel connections 10 and perpendicular connections 11. The rods have, on one of the vertical faces, a thickness *e* and along the other face, a thickness *e'*.

Figure 1B:
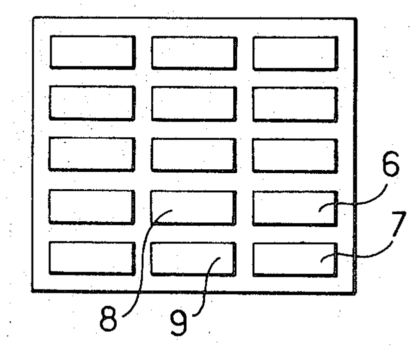

FIG. 1*b* shows the same module seen from the top. It comprises exclusively welds parallel to one another such as 6, 7, 8, and 9. It will be conceived easily that it is possible to industrialize the producing of these welds all identical to one another.

Figure 1C:
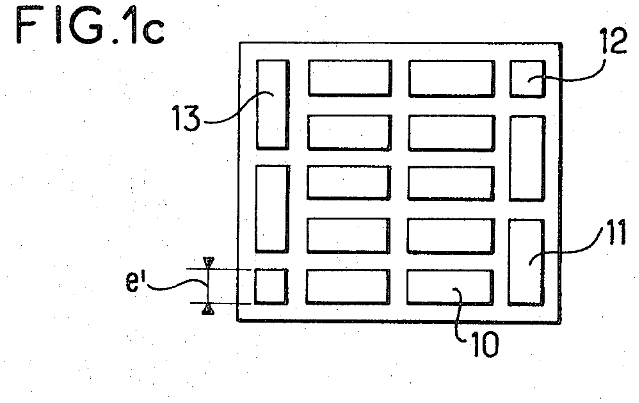

FIG. 1*c* shows clearly the welds, also parallel to the preceding welds such as 10 and also welds such as 11 perpendicular to the preceding welds and lastly terminals such as 12 and 13. It is obviously an advantage to mechanize the producing of welds such as 10 and 11. Lastly, whatever the weld method used may be, the connections of the two end terminals 12 and 13 of the module will be linked individually to the following parts of the equipment in which the thermoelectric module is inserted.

The method according to the invention draws its inspiration from these considerations and enables the producing of the welds such as 6, 7, 8, and 9 on the upper face of the module and such as 10 and 11 on the lower face of the module in a very rapid manner.

Figure 2A:
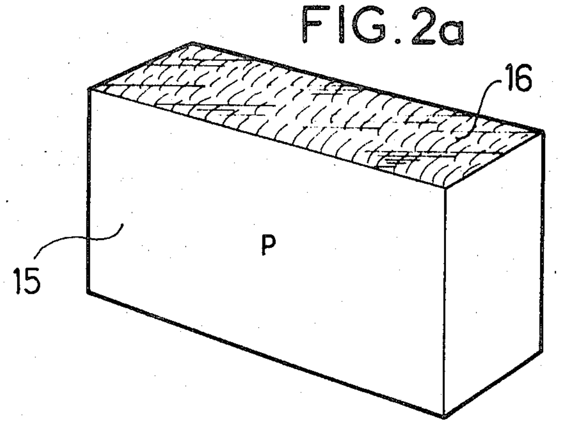
Figure 2B:
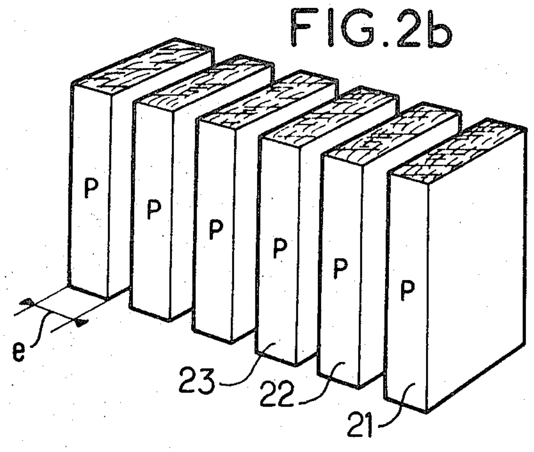

FIGS. 2*a* and 2*b* show the first cutting out of a parallelepipedical block 15 of P type, for example, it being understood that there is, moreover, a block of N type having the same dimensions.

FIG. 2*a* shows a P block 15 whose upper face 16 and lower face (not visible in that figure) are tin-plated, for example, using a soft brazing material BiSnSb or a brazing material BiSb whose melting point is close to 300° C. or, even, whose two faces are nickel-plated. That first operation facilitates the subsequent dipping in the bath of brazing material and appears as a particular advantage more particularly in the case where the use of a scouring flux proves detrimental to the electronic properties of the materials used.

The same treatment is applied to the block N.

These blocks 15 are then cut out into strips such as 21, 22, or 23 (FIG. 2*b*) either directly with a diamond wheel or rough ground on a grinding machine and finished on a lapping machine. The thickness *e* of the strips will be as slight as possible when attempting to obtain the greatest number of elements per unit of surface or of volume, this very frequently being the case.

Figure 3:
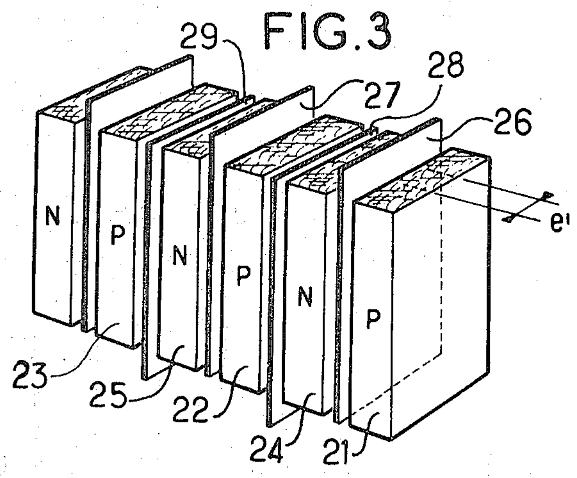
FIG. 3 shows the stacking of P plates and N plates.

FIG. 3 shows diagrammatically the subsequent operations. A stacking of P elements such as 21, 22, and 23, separated from N elements such as 24 and 25 by insulating sheets such as 26 or 27 arranged between the P and N strips 21 and 24 or 22 and 25 is effected. These sheets extend very slightly beyond the upper level of the strips. The N and P strips 24, 22 or 25, 23 are separated by insulating sheets 28, 29 extending very slightly beyond the lower level of the strips.

These stacks may be held by mechanical pressure means but they may also be cemented by coating plastic sheets or strips with a suitable cementing substance, for example, a liquid epoxy cement in which the excess is removed by simple pressure, leaving, between each successive P plate and N plate the minimum distance. These stacks may also be formed by inserting, between the strips, sheets of insulating material which may be thermo-welded.

Figure 4:
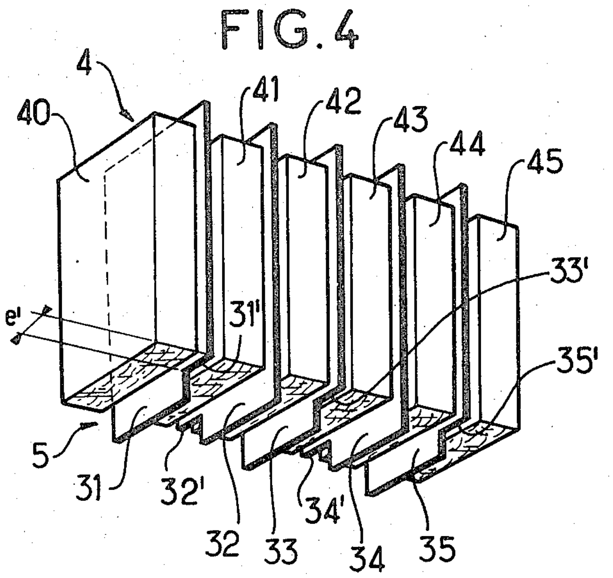
FIG. 4 shows the assembling principle for the slices of rods.

After that operation, the stacking of the strips is cut out in a direction perpendicular to the face of the strips in thin slices 40, 41, 42, 43, 44, 45 (visible in FIG. 4), having a thickness *e* corresponding to the second transversal direction of the P and N rods forming the thermocouples. Each slice thus obtained begins, for example, with a P rod. It therefore ends with an N rod. It is then sufficient to turn the second slice then the fourth, the sixth, etc. ... round to have a set of slices beginning alternately with a P rod and an N rod.

Between these slices 40, 41, 42, 43, 45, very thin sheets 31, 32, 33, 34, 35 of insulating material, which extend beyond the top and the bottom of the slices assembled are inserted between these slices 40, 41, 42, 43, 45, in the same way as previously. Moreover, these new sheets of insulating material have, at their lower edge, a rectangular cutaway portion arranged alternately to the right and to the left of the stack E of slices 40, 41, 42, 43, 45, such as appears in FIG. 4, in which the cutaway portions 31', 32', 33', 34', 35', have the width *e* of a rod and a height equal to the height of the sheet above the level of the thermoelectric elements. In that figure, the sheets of insulating material corresponding to the first cutting out operation have been removed with a view to simplification.

Figure 5:
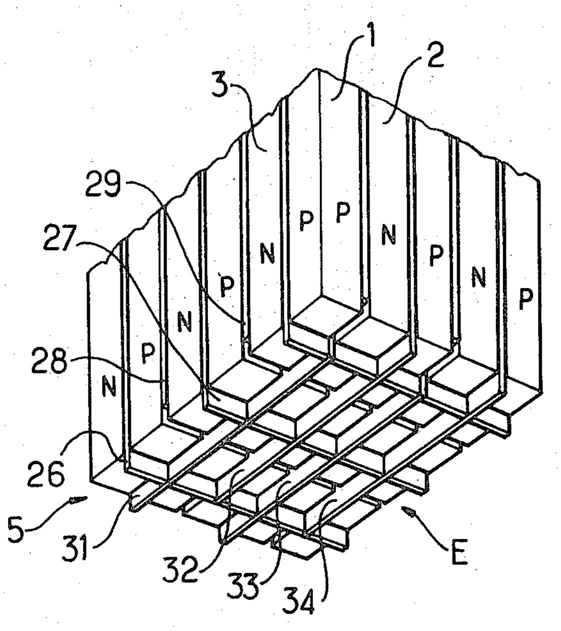
FIG. 5 shows, as seen from below, the assembly of rods before welding.

FIG. 5 then shows the general aspect of the stack E seen from below, ready for welding with the two families of sheets of insulating material arranged perpendicularly. The sheets inserted between the P strips and N strips after the first cutting out are shown at 26, 27, 28, and 29, whereas the sheets inserted after the second cutting out are visible at 31, 32, 33, 34.

The collective welding operation may then be effected in a bath of brazing material having a composition compatible to that of the tin-plating and which may be, for example, the same or a bath having approximately the same composition.

The brazing sets more easily if the parts have been subjected to tin-plating or to a previous scouring operation; by capillary flow, it establishes bridges between the elements where the insulating sheet does not extend beyond the level of the strips. The composition and the temperature of the brazing determine by what length it is necessary to make the plastic sheets extend outside the strips to prevent the establishing of bridges.

The required module is thus obtained.

An example of embodiment is constituted by a thermoelectric module of 91 couples arranged in fourteen rows of 13 elements, each element having a dimension of 0.3 mm × 0.3 mm × 20 mm. The thickness of the sheet of insulating material is in the order of 0.02 mm (it is made of polyimide). The brazing material consists of bismuth-antimony.

It will easily be understood that if it is required to obtain strips and rods whose cross section comprises sides in the order of two tenths of a millimeter, it is indispensable to use thermoelectric bodies whose granulometry is less than that dimension. The size of the grains in the plane perpendicular to the strips must not therefore exceed 200 microns. Such granulometry is easily obtained by working on the blocks of thermoelectric products by the powder metallurgy technique, controlling carefully the dimension of the grains.

The method which has just been described enables thermoelectric modules which are quite remarkable, both by their reliability and by their very small dimensions, to be obtained. The method described herebelow has made it possible to lower considerably the cost of such productions and hence to extend the field of their application to be extended, whereas it was, up until now, limited to aerospace applications and to heart stimulators.

Although the means which have been described may appear to afford the greatest advantages for implementing the method according to the invention in a particular technical structure, it will be understood that various modifications may be made thereto without going beyond the scope of the invention and that more particularly previous tin-plating or scouring may be effected at any phase previous to dipping in a brazing material or replaced by any other equivalent previous operation, making the fixing of the brazing material on the substances provided easier without being detrimental to their electrical or thermoelectric properties.

What is claimed is:

1. Method for manufacturing thermoelectric modules by collective welding of the thermocouples from blocks of P type and N type material having a parallelepipedic shape and having the same dimensions and a predetermined granulometry comprising:

cutting respective masses of semiconductor material parallelepipedic blocks parallel to one of their faces in strips of P type material and strips of N type material;

assembling alternately the same number of strips of P type and of N type material;

inserting between the adjacent faces of said strips insulating sheets which are very thin and have the same width as said strips to form a parallelepipedical P and N stack;

cutting the P and N stack into thin slices in a direction perpendicular to the faces of the P and N strips to form a series of rods;

forming a parallelepipedic stack by assembling in parallel a certain number of these slices after having inserted between the adjacent faces, very thin insulating sheets so as to place successively a slice beginning with a P rod and a slice beginning by an N rod;

establishing conductive connections between the P and N rods;

characterized in that the insulating sheets inserted between the P strips and N strips during the first inserting step have a height slightly greater than that of the strips and are arranged alternately so as to be substantially flush with one face of the P stack and N stack and overlapping slightly on the other face, and in that the insulating sheets inserted between each slide during the second inserting step overlap slightly on the two opposite faces of the stack and have, at their lower corner, a rectangular cutaway part arranged alternately on the right hand and on the left of the stack, said step of establishing connections being effected by dipping of the said two opposite faces of the stack in brazing material.

2. Method for manufacturing thermoelectric modules according to claim 1, characterized in that in parallelepipedic the blocks of P type and N type, the two opposite faces which will be cut out in two perpendicular directions, are previously tin-plated before the cutting of the said blocks into strips.

3. Method for manufacturing thermoelectric modules according to claim 1, characterized in that the two faces of the parallelepipedic stack orthogonal to the P rods and N rods are tin-plated before being dipped in the brazing material.

4. Method for manufacturing thermoelectric modules according to claim 1, characterized in that the two faces of the parallelepipedic stack which are orthogonal to the P rods and N rods are scoured before being dipped in the brazing material.

5. Method for manufacturing thermoelectric modules according to claim 1, characterized in that the insulating sheets are constituted by a polyimide film which may be thermowelded, withstanding brazing temperatures.

6. Method for manufacturing thermoelectrical modules according to claim 5, characterized in that the insulating sheets inserted between thè strips of thermoelements and the slices are coated previously with an epoxy cement, then pressed so as to remove any unrequired thickness of epoxy cement.

* * * * *